(12) United States Patent
Griffioen et al.

(10) Patent No.: US 6,880,219 B2
(45) Date of Patent: Apr. 19, 2005

(54) METHOD OF INSTALLING Y-BRANCH SPLITTABLE CONNECTOR

(75) Inventors: Willem Griffioen, Ter Aar (NL); Arie Van Wingerden, Hendrik Ido Ambacht (NL); Cornelis Van 'T Hul, Den Hoorn (NL); Pieter Lock, 's-Gravenhage (NL); Willem Greven, Delfzijl (NL); Frans Robbert Bakker, Wagenborgen (NL); David F. Hawkins, London (GB)

(73) Assignee: NKF Kabel B.V. (NL)

( * ) Notice: Subject to any disclaimer, the term of this patent is extended or adjusted under 35 U.S.C. 154(b) by 207 days.

(21) Appl. No.: 10/315,663

(22) Filed: Dec. 10, 2002

(65) Prior Publication Data

US 2003/0080555 A1 May 1, 2003

Related U.S. Application Data

(62) Division of application No. 09/750,802, filed on Dec. 27, 2000, now Pat. No. 6,619,697.

(51) Int. Cl.[7] ............................ B21K 21/16; F16L 41/00
(52) U.S. Cl. ................................. 29/401.1; 285/126.1
(58) Field of Search ............................... 29/401.1, 428, 29/461, 235, 239, 897.1; 285/133.11, 123.1, 373, 126.1, 132.1, 133.4, 15

(56) References Cited

U.S. PATENT DOCUMENTS

| 2,031,849 A | 2/1936 | O'Leary |
|---|---|---|
| 3,023,032 A | 2/1962 | Johnston et al. |
| 3,486,771 A | 12/1969 | Conlin |
| 3,633,943 A | 1/1972 | Ramm |
| 3,711,633 A | 1/1973 | Ghirardi et al. |
| 4,367,769 A | 1/1983 | Bain |
| 4,784,412 A | 11/1988 | Van Dongen |
| 4,797,512 A | 1/1989 | Kumagai et al. |
| 4,799,757 A | * 1/1989 | Goetter ..................... 385/135 |
| 5,121,458 A | * 6/1992 | Nilsson et al. .............. 385/100 |
| 5,125,060 A | 6/1992 | Edmundson |
| 5,210,812 A | 5/1993 | Nilsson et al. |
| 5,266,740 A | 11/1993 | Hsu |
| 5,315,062 A | 5/1994 | Hoshino |
| 5,394,502 A | 2/1995 | Caron |
| 5,971,035 A | 10/1999 | Griffioen |

* cited by examiner

Primary Examiner—John C. Hong
(74) Attorney, Agent, or Firm—Dennis T. Griggs (57) ABSTRACT

A method for installing branches in a protective ducting system in which guide tubes and cables have already been laid, wherein at a desired branch location in the protective duct, a splittable Y-branch connector with an inlet opening, an outlet opening and at least one branch opening is installed by cutting a short section from the duct at the desired branch point and exposing the guide tubes and cables, opening the splittable branch connector and arranging it around the exposed guide tubes and cables, and closing and securing the Y-branch connector with splittable coupling collars in such a manner that the inlet opening and the outlet opening engage in sealing manner over the respective cut ends of the existing duct, and the branch opening of the connector is secured by engagement of a branch stub around a branch duct through which a branch guide tube is laid.

12 Claims, 6 Drawing Sheets

METHOD OF INSTALLING Y-BRANCH SPLITTABLE CONNECTOR

CROSS REFERENCE TO RELATED APPLICATIONS

This application is a divisional of U.S. application Ser. No. 09/750,802 filed Dec. 27, 2000 now U.S. Pat. No. 6,619,697.

STATEMENT REGARDING FEDERALLY SPONSORED RESEARCH OR DEVELOPMENT

Not Applicable

BACKGROUND OF THE INVENTION

This invention relates generally to optical fiber communication systems, and in particular to a split table branch connector and a method for installing the branch connector in an existing protective ducking system in which channelization guide tubes and/or cables already have been installed.

Communication systems employing optical fibers have termination points where optical fiber cross connections, interconnections and terminations are established. The termination points are generally located at a customer's premises, remote from a central office. To reach each termination point, the optical fiber cables must be separated (to form a branch) from a bundle of cables (a "trunk" or "ring") and then are routed through a protective branch duct from various junctions or branch locations to remote customer interface access stations.

In the access network, the connection from the central exchange office to the customer passes many splices and branches. Splicing and branching in copper twisted-pair has been done for more than a century. However, for optical fiber (where a minimum of splices is preferred) the conventional technology does not suffice. Optical access networks require a high degree of versatility: it is not known when or where a connection will be requested, installation must be fast, new connections should not disturb existing ones, both business and consumer markets may ask for solutions requiring different quality of service, bandwidth provisions and redundant connections. Also excessive digging should be avoided and trench space is limited.

Other factors also must be considered when branching is performed in a fiber optic cable network. A major concern is avoidance of damage to the cable during installation. Damage can occur in a variety of ways, namely 1) radial crushing the cable with installation equipment; 2) severe bending, twisting, flexing or stretching damage due to excessive forces applied during installation; 3) damaging the protective cable jacket, such as by abrasion, cracking or cutting the outer protective layer; and 4) long term exposure of the cable to environmental factors which cause thermal cycling.

Another concern is ease of installation and reduction in the amount of time needed to install the cable. Also, there is a concern to avoid splices in the cable as much as possible. Splices are time consuming to make and incur considerable installation costs. Generally, it is desirable to install the longest continuous length of cable possible to reduce the number of splices needed for the desired cable run. Moreover, it is not desirable to have a large number of splice joints in view of the relatively substantial signal damping caused by each joint in proportion to the total signal damping of the overall signal path.

Protective cable ducts have been channelized in an effort to satisfy these concerns. For this purpose a tube, whose interior may have a lower coefficient of friction than the existing duct, is installed in the existing protective duct, (direct buried is also possible), thereby establishing a separate channel in which cable, optionally at a later time, can be blown or pulled through the protective duct over a greater length. It may also be desirable to install in an existing duct a larger number of tubes with a smaller cross section than that of the existing duct if it is desired to use each of the smaller tubes as a separate channel or sub-duct for single-core or multi-core copper or glass fiber cables. Further, it may be necessary to install in an existing duct a protective tube with a water barrier, so that in the existing duct, whose interior gradually fills up with water through diffusion, a waterproof conduit is created by means of the second tube, this waterproof conduit allowing the routing of cables without a water shield.

U.S. Pat. Nos. 4,850,569 and 4,934,662 to Griffioen et al. describe combining high speed air flow with a pushing force applied at the entry end of the conduit to install a traditional (i.e., with non-negligible stiffness) cable. These techniques also have been used advantageously for installing channelizing guide tubes in an existing protective duct. For example, in U.S. Pat. No. 5,884,384 to Griffioen, channelization is achieved by installing a bundle of guide tubes or sub-ducts in an existing protective duct by means a fluid under pressure, for instance compressed air, together with a pushing force exerted on the guide tubes as they enter the protective duct.

In U.S. Pat. No. 5,971,035 to Griffioen a method is provided for installing a ducting system with branches, wherein at the point of a branch in an existing duct of the system a tubular branch element with an inlet opening, an outlet opening and at least one branch opening is arranged by removing a duct portion from the existing duct at the point of the branch, by sliding the branch element on one of the free ends of the existing duct resulting from the interruption, replacing the removed duct portion or a portion identical in shape in the interruption and moving and securing the branch element in such a manner that the inlet opening and the outlet opening engage in sealing manner over the respective ends of the existing duct. In the duct with branches, over the entire length thereof, a bundle of sub-ducts can be arranged, which sub-ducts can then be branched-off in a simple manner at the location of a branch. In a duct thus branched-off, for instance a continuous fiber optic cable can be installed.

The method and branch apparatus of Griffioen U.S. Pat. No. 5,971,035 have achieved excellent results for new installations where branch locations are known in advance and the branch connections can be installed at the known locations. A limitation on this method is that such branching is intended for installation before cables are laid in, since it is necessary to cut and completely separate the free ends of the protective duct to allow serial attachment of the branch connector and end couplings. This means that any existing plant components, e.g., guide tubes and/or cables already laid, would also have to be cut and separated to allow installation of the branch connector. It would then be necessary to splice and restore the existing fiber cables (which would require some over-length provision and two splices to restore each fiber path), followed by water-proofing and mechanical restoration of the duct. This naturally would cause an interruption of existing cable services, also causing some signal loss and degradation at each splice point. For these reasons such interference with existing plant equipment is to be avoided as much as possible.

It will be appreciated that building optical access networks with conventional methods and equipment is challenged by the uncertainties imposed by growing demand. For example, to splice a branch-cable to a feeder cable it is required to build over-length (window cut) in the feeder cable, in order to allow splicing above the trench. This is done at a predetermined fixed branch position, close to the customer. If all next customers were known in advance, over-length and branches could also be built close to them. But this is hardly ever the case. The location where branches and over-length may be needed is just a guess. In practice new customers are far away from these locations. To avoid digging again along the feeder route extra tubes are laid parallel. A lot of trench space is consumed and much money is invested in outside plant. Also, the number of fibers installed from the beginning means high initial costs. Moreover, to avoid numerous splices for every length extension more length must be installed than needed for the first customer.

Consequently, there is a continuing need for improvements in outside plant equipment and installation methods that can provide versatility to meet growing, unpredictable demand, reduce the number of splices required, and provide mid-span branching access at any place, any time, even after cables have been laid in existing protective ducts.

BRIEF SUMMARY OF THE INVENTION

The invention provides a solution that makes it possible to install branches in an existing duct in which channelization guide tubes and/or cables have already been laid wherein the existing duct can be cut at any point where a branch is desired, without disturbing existing services. This is accomplished by a "splittable" branch connector that is mountable in an operative branching position on the free end portions of an existing duct that has been cut at any mid-span location where a branch is desired.

The branch connector includes a pair of separable housing members that are engagable with each other, each having end couplings for clamping onto the cut ends of the duct. The housing members include duct sidewall portions that can be installed in spaced relation around existing guide tubes and cables, thus forming a serial extension of the existing duct. When clamped together, the sidewall portions form a protective duct restoration passage through which the existing guide tubes and cables extend, undisturbed. The restoration housing members, when clamped together in the protective restoration position, also form an inlet opening and an outlet opening for receiving the cut free end portions of the main duct. Separable fasteners releasably hold the housing members in clamping engagement with each other and with the free end portions of the protective duct.

Either one or both of the restoration housing members include sidewall portions forming a tubular branch stub in communication with the restoration duct passage. According to this arrangement, the splittable branch connector restores the existing protective duct and provides a protective branch stub permitting serial connection of an existing guide tube to a branch guide tube through which a continuous drop cable can be installed by pushing and/or blowing.

According to an important aspect of the invention, best results are obtained when the guide tubes have been installed in a loose bundle that does not entirely fill up the protective duct to offer sufficient mechanical protection, to make all tubes accessible at any place and for ease of installation of the bundle. By this arrangement, each guide tube is readily available and easily maneuverable at any desired mid-span location. A short segment of the protective duct is cut away and removed, thus exposing the loose bundle of guide tubes.

A selected (empty) guide tube is then cut, and the cut-free end is routed through the branch stub for serial attachment to a drop-branch guide tube. The other cut end of the selected guide tube is sealed. After connecting the drop-branch guide tube, a protective branch duct is attached to the branch stub by a screwable connector, and a cable is then installed through the branch by blowing and/or pushing.

Through the method of the present invention, at any desired mid-span point in the main duct, even after as well as before the installation of a bundle of guide tubes and/or cables, a branching point can be realized, whereby, due to the restoration of the continuous inside wall of the existing duct at the interruption, a continuous conduit for protecting the existing guide tubes and cables is maintained, and moreover, a branching stub conduit is provided for routing a drop cable, all without damaging or disturbing the existing guide tubes and/or cables.

The invention also provides an improved branch connector for use in practicing the method of the present invention, characterized by separable, complementary housing portions, each in the form of a concave shell, and when assembled together forming an internal duct passage, an inlet opening, an outlet opening and at least one branch opening, with the housing portions forming the inlet opening and the outlet opening also including coupling means for connecting them in sealing engagement onto the spaced-apart cut end portions of the existing duct, and the housing portions forming the branch opening also including coupling means for connecting them in sealing engagement with a protective branch duct.

BRIEF DESCRIPTION OF THE DRAWING

The accompanying drawing is incorporated into and forms a part of the specification to illustrate the preferred embodiments of the present invention. Various advantages and features of the invention will be understood from the following detailed description taken in connection with the appended claims and with reference to the attached drawing figures in which:

DETAILED DESCRIPTION OF THE INVENTION

Preferred embodiments of the invention will now be described with reference to various examples of how the invention can best be made and used. Like reference numerals are used throughout the description and several views of the drawing to indicate like or corresponding parts.

Figure 1:
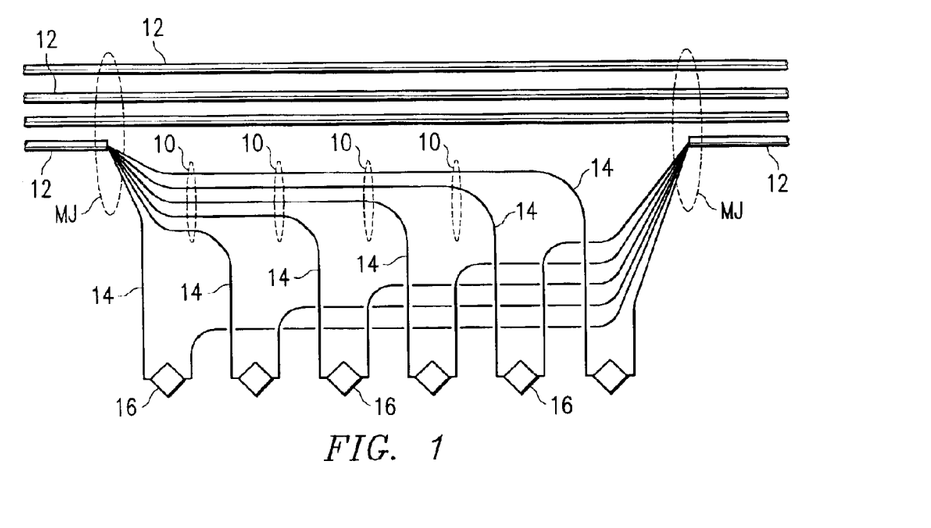
FIG. 1 is a simplified routing diagram showing multiple distribution tubes and redundant fiber optic cables laid in drop tubes running to business customers from multiple branching points.
Figure 2:
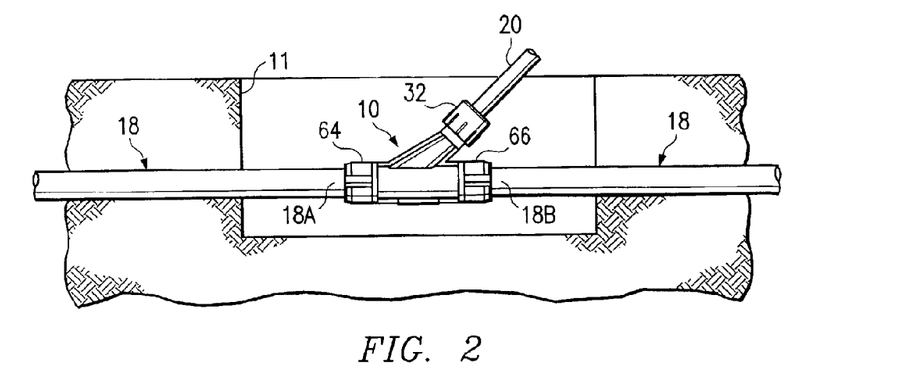
FIG. 2 is an underground sectional view showing the splittable branch connector of the present invention installed at a mid-span branching location in a protective distribution duct.

The splittable Y-branch connector 10 of the present invention is shown installed in a simple access network in FIG. 1 and FIG. 2. Here four feeding 12-fiber cables 12 are spliced at multi-joint splice points MJ to six 2-fiber branching drop cables 14 that make the drop to customer interface access stations 16, everything redundantly connected. The drop cables 14 are guided from the splice points MJ through the customer Y-branch connectors 10 to the customer stations 16, thus allowing one-shot blowing installation of cable to the customer. The entire feeding bundle and Y-branch drop connector 10 fit into a single 40 mm protective duct 18 as shown in FIG. 2. With this configuration it is possible to connect thirty customer access stations 16 in a redundant way. It is also possible to reserve some extra capacity at the branch points.

FIG. 2 shows the installation of the Y-branch connector 10 in an existing protective duct 18 for routing a drop cable 14 through a branch duct 20 that leads to the customer station 16. The loose bundle 22 of guide tubes 24 are previously installed and are intended to channelize the protective duct, with each guide tube 24 functioning as a separate cable duct. Feeder cables 12 and other drop cables 14 may already be laid in one or more of the guide tubes 24.

The function of the protective duct 18 is to guide and protect the guide tubes 24 and their optical cables. In order to allow installation of a bundle 22 of loose guide tubes by blowing, the protective duct should resist the required pressure differences. The protective duct may be buried directly into the ground as shown in FIG. 2 and is constructed of commonly used duct material, e.g. high-density polyethylene (HDPE). It should be circular and uniform in cross-section throughout its length. The outer and inner surfaces should be free from irregularities such as cracks, pinholes, joints, water splash marks, die-marks, repairs and all other defects.

The function of the guide tubes 24 is to form dedicated channels to guide the drop cables 14 through the access network without splicing the cables. In order to allow installation of both the optical cables and the bundle of guide tubes by blowing, the guide tubes should resist the needed pressure, both internal and external (to avoid implosion the guide tubes 24 are also pressurized during installation of the bundle). The guide tubes preferably are formed of high-density polyethylene (HDPE). Other material, e.g. nylon or ABS, is also possible. The guide tubes are preferably circular and uniform in cross-section throughout their length. Their outer and inner surfaces should be free from irregularities such as cracks, pinholes, joints, water splash marks, die-marks, repairs and all other defects.

The outside of the guide tubes 24 should be free from lubricant or other contamination. The diameters of the guide tubes used in the loose bundle installation are 7/5.5 and 10/8 mm. The requirement for the number of guide tubes is determined as follows: the total cross-sectional area of the outside of the guide tubes 24 should be about half of the cross-sectional air flow area inside the protective duct 18. Preferably, the guide tube bundle fill factor is approximately 50%, that is, the effective cross sectional area occupied by the guide tube bundle 22 should be about one-half of the total cross sectional air flow area of the protective duct 18. Less than optimum values are obtained but relatively trouble-free installation is nevertheless realized when the guide tube bundle fill factor is less than 50% but not less than about 30%, and more than 50% but not exceeding about 60%.

Figure 3:
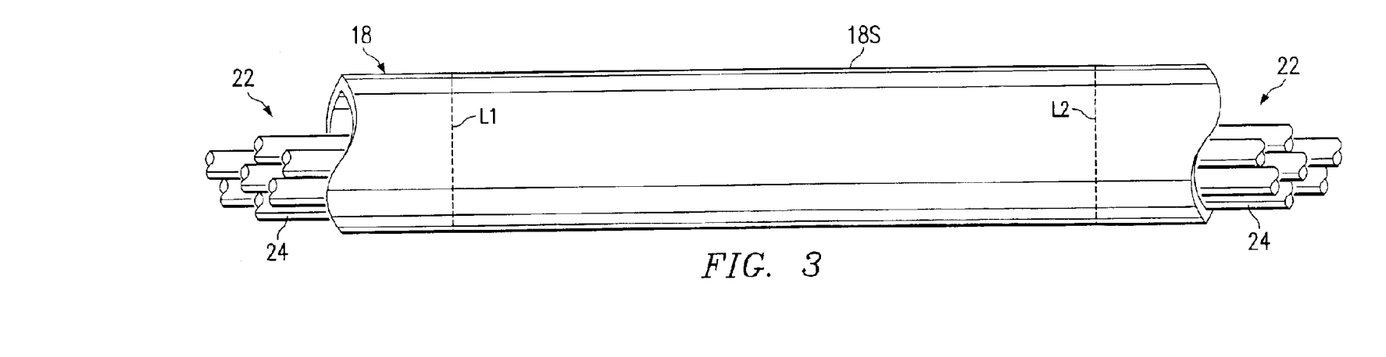
FIG. 3 is a side elevation view, partly broken away, of a section of the distribution duct shown in FIG. 2, containing a loose bundle of guide tubes and/or cables.

Branches, joints and terminations are needed to make a network of the guide tubes and cables. To accomplish this a number of components are required. A drop cable 14 can branch off from the bundle 22 without making a splice. Branching can be done at any place and any time by simply opening a man-hole or hand-hole 11 at the desired branch location, as shown in FIG. 2, to expose the protective duct 18. The protective duct 18 is then cut along the cut lines L1 and L2, for example as shown in FIG. 3, and a short duct section 18S is removed, exposing the loose bundle 22 of guide tubes 24 between the cut end portions 18A, 18B. In this example, cables may already be laid in one or more of the guide tubes and one or more of the guide tubes are empty.

It is also possible to just dig the protective duct up at any place, making the Y-branch direct buried, even without the need to use a hand-hole. This is even to be preferred since placing the Y-connector will be easier and less trench space consuming.

Figure 4:
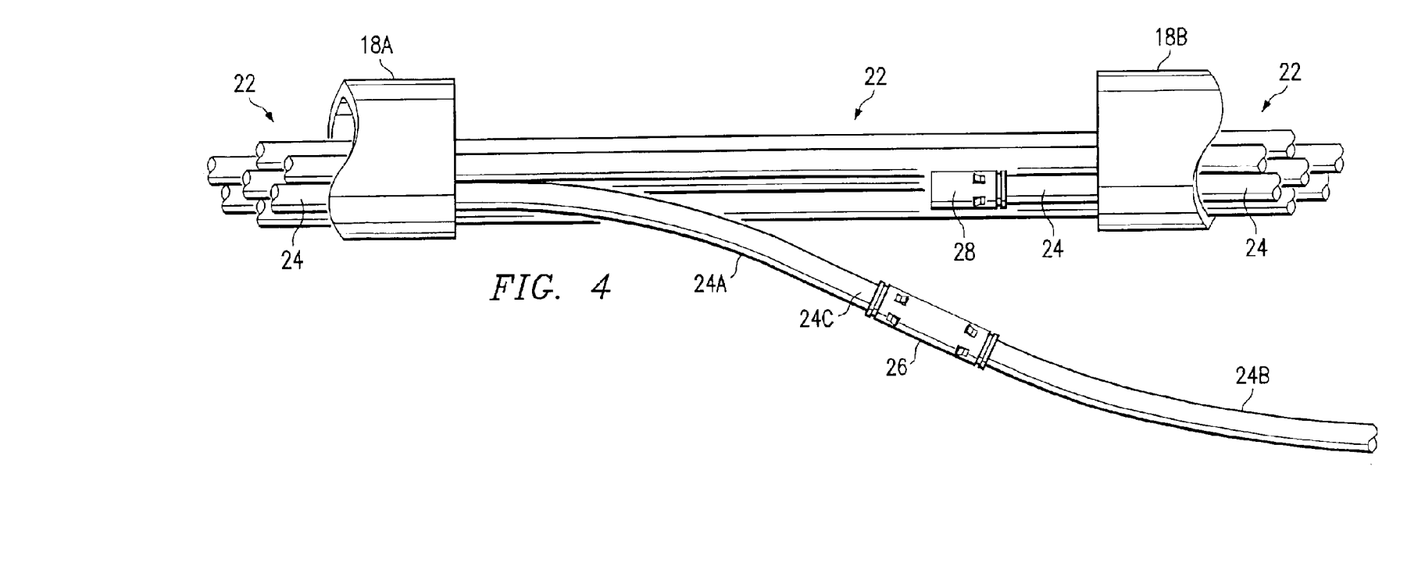
FIG. 4 is a view similar to FIG. 3 with a window section of the distribution duct removed and exposing the loose bundle of guide tubes.
Figure 5:
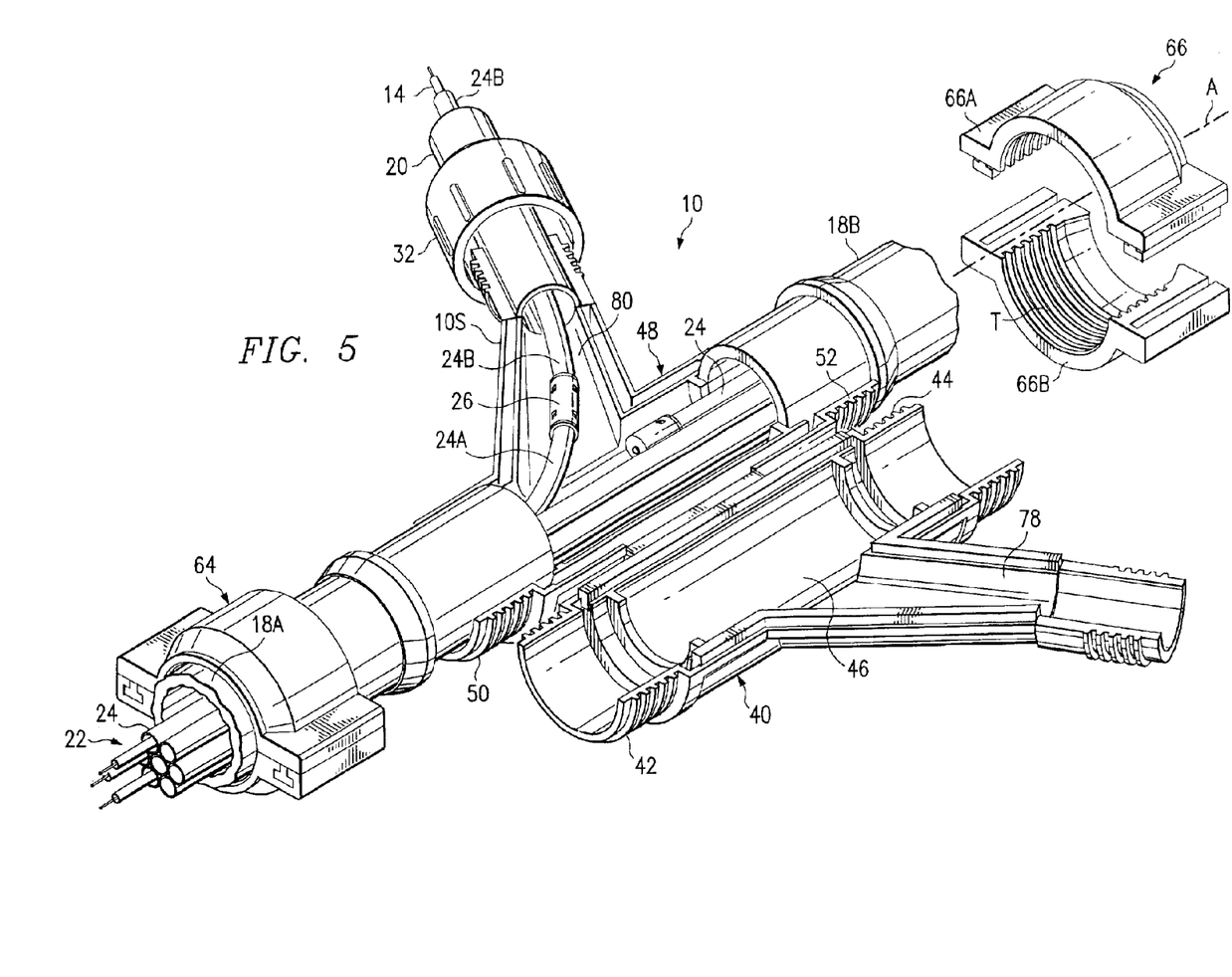
FIG. 5 is an exploded perspective view of the splittable branch connector, ready for assembly and clamping onto the cut ends of the distribution duct.

Before installing the drop cable, the exposed section of a selected one of the empty guide tubes 24 is cut at 24C and the free end 24A is then connected to a branch guide tube 24B as shown in FIG. 4 and FIG. 5. A serial guide tube connection is made by a permanent or push/pull guide tube coupling 26. The remaining cut end portion of the empty guide tube 24 is sealed with a plug or cap 28.

The branch guide tube 24B is installed in a protective branch duct 20 that leads to a customer interface station 16 (FIG. 1 and FIG. 2). The main protective duct 18 at the branch point is restored and coupled to the branch protective duct, by using the clip-on splittable Y-branch connector 10. The Y-branch connector 10 includes a tubular branch coupling stub 10S. The protective branch duct 20 is joined in at least a mud-tight union with the coupling stub 10S so that a continuous, dedicated channel is established.

Figure 7:
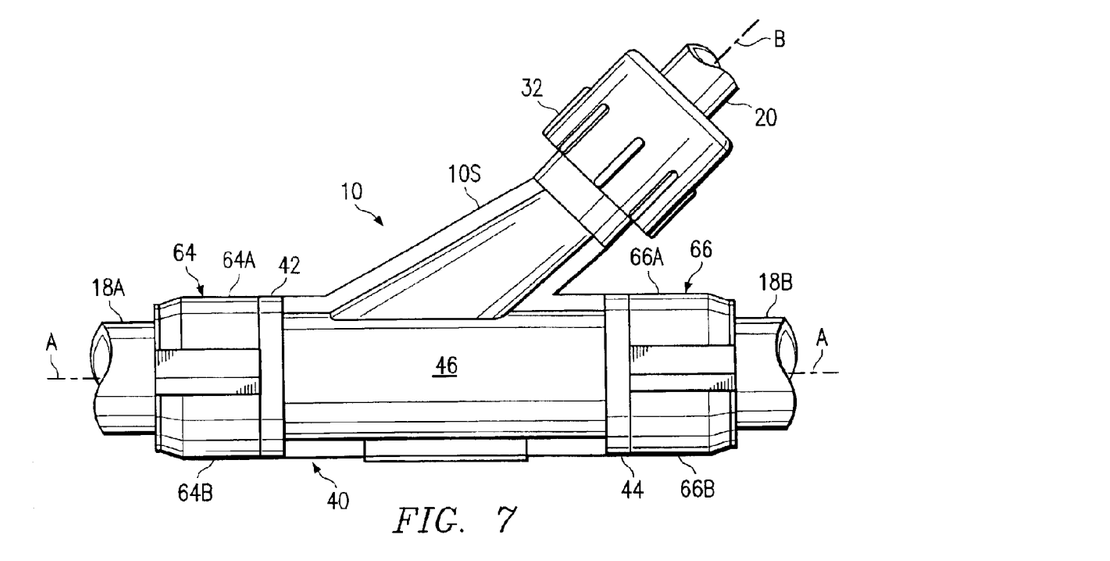
FIG. 7 is a side elevation view of the branch connector of the present invention.
Figure 8:
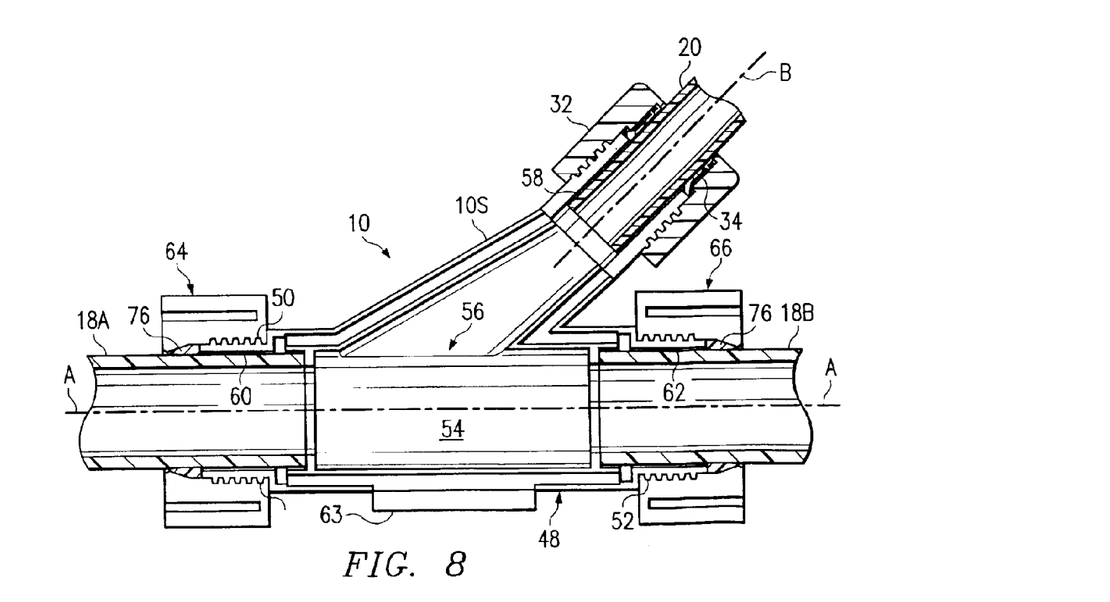
FIG. 8 is a longitudinal sectional view thereof.
Figure 9:
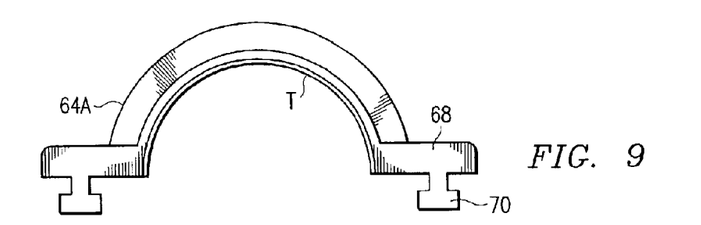
FIG. 9 is an elevation view of a male coupling component of the end coupling collars shown in FIG. 7 and FIG. 8.
Figure 10:
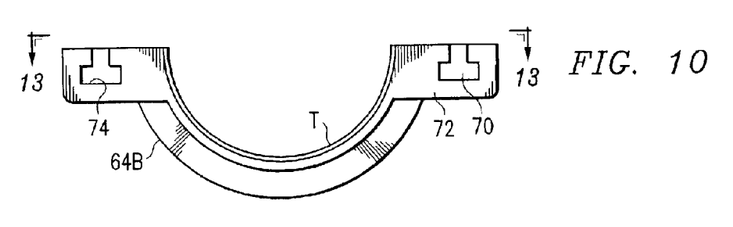
FIG. 10 is an elevation view of a female coupling component that is configured for complementary slide-fit interlocking engagement with the male coupling component shown in FIG. 9.
Figure 11:
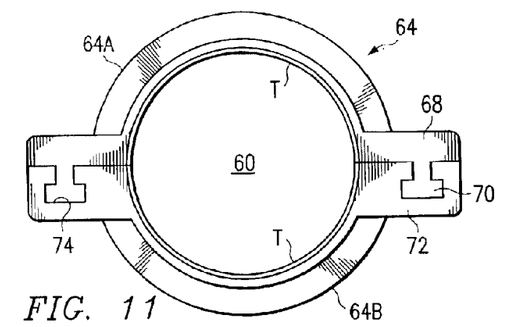
FIG. 11 is a front elevation view showing the coupling components in interlocking engagement, forming a threaded coupling collar.
Figure 12:
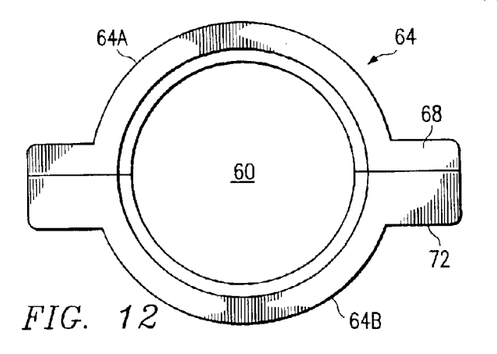
FIG. 12 is a rear elevation view of the threaded coupling collar.
Figure 13:
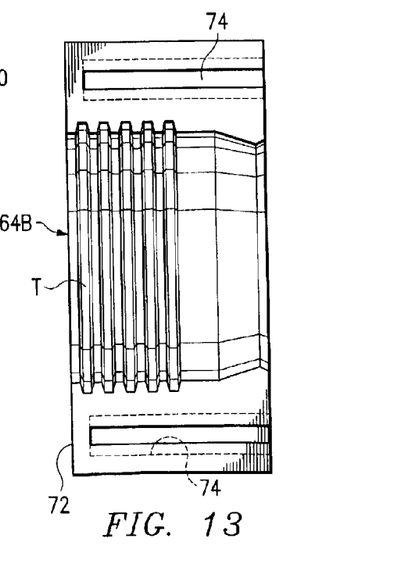
FIG. 13 is a side elevation view of the female coupling collar component taken along the line 13—13 of FIG. 10.

For straight coupling of the protective branch duct 20 a connection can be made by using simple straight "screwable" coupling, for example the threaded coupling collar 32 shown in FIG. 2, FIG. 7 and FIG. 8. The coupling collar is slipped onto the free end of the branch duct prior to insertion of the branch duct into the throat of the branch stub 10S. The coupling collar unions with the branch stub 10S and the branch duct 20 are sealed preferably water-tight but at least mud-tight using a compression ring 34. The function of the compression ring is to firmly grip the duct-end 20, such that a sufficiently high pull-out strength of this duct-end is obtained. The guide tube serial connections 26 are sealed by gas-tight and water-tight O-ring seals. In this way dedicated channels are formed by the guide tubes 14, 24A, 24B in which small, but outside-plant resistant, optical cables 14 are pushed or blown in through the branch connection to the customer without splicing.

The function of the guide tube coupling 26 is to allow branching installation of a drop cable. The guide tube coupling 26 should have a smooth inside geometry to allow passing of the cable without sticking and should be airtight and pressure resistant to allow installation by blowing. The guide tube coupling 26 can be permanent or a push/pull type.

The function of the splittable Y-branch connector is to elongate or restore the protective duct 10 and to allow installation of additional guide tubes and/or cables. The mounted Y-branch connector 10 should have a smooth inside geometry of large bending radius to allow passing of additional guide tubes and/or cables without sticking and should be at least mud-tight.

Referring now to FIG. 5, FIG. 7 and FIG. 8, the splittable Y-branch connector 10 includes a first housing member 40 (FIG. 7) having a first coupling end portion 42, a second coupling end portion 44 and a duct sidewall restoration portion 46 extending therebetween. A second housing member 48 is constructed in mirror-image complementary relation, also having a first coupling end portion 50, a second coupling end portion 52 and a duct sidewall restoration portion 54 extending therebetween. The separable, complementary housing portions, each in the form of a concave shell, when assembled together form an internal duct restoration passage 56, at least one branch opening 58, an inlet opening 60, and an outlet opening 62.

The housing members 40, 48 are engagable with each other in the branching position (shown in FIG. 5), thereby forming a serial duct restoration passage 56 extending between the duct coupling end portions. As shown in FIG. 5, FIG. 7 and FIG. 8, the housing members are movably coupled together by a hinge assembly 63, preferably a living hinge, so that the housing members can open and close together in clam-shell movement around the guide tube bundle 22.

The coupling end portions are engagable with each other in the branching position, thereby defining the inlet and outlet openings 60,62 for admitting the free end portions 18A, 18B of the existing duct into the duct restoration passage 56. Preferably, the union of the housing members is sealed water-tight or at least mud-tight by compressible insert seal strips confined in longitudinal seal pockets along the interface between the housing members.

A pair of splittable coupling collars 64,66 are provided for releasably engaging the first and second housing members 40,48 and clamping them together in the operative branching position. Referring to FIGS. 9, 10, 11, 12 and 13, the preferred construction of the splittable coupling collars is indicated. Each coupling collar is formed in two separable (splittable) male and female sections 64A, 64B and 66A, 66B respectively. The male collar sections are provided with coupling flanges 68 equipped with T-profile ribs 70 and the female collar sections are provided with coupling flanges 72 intersected by T-profile channels 74 that are dimensioned to allow sliding axial insertion of the T-profile rib into the complementary T-profile channel, thereby producing a releasable interlocking fit between the collar sections.

The collar sections 64A, 64B and 66A, 66B are also provided with internal threads T for making up a tight union with the threaded end portions of the restoration housing members for engaging the coupling collars 64 and 66 sealed preferably in a water-tight but at least mud-tight union using a compression ring 76. The function of the compression ring is to firmly grip the duct-ends 18A and 18B, such that a sufficiently high pull-out strength of these duct ends is obtained.

Figure 6:
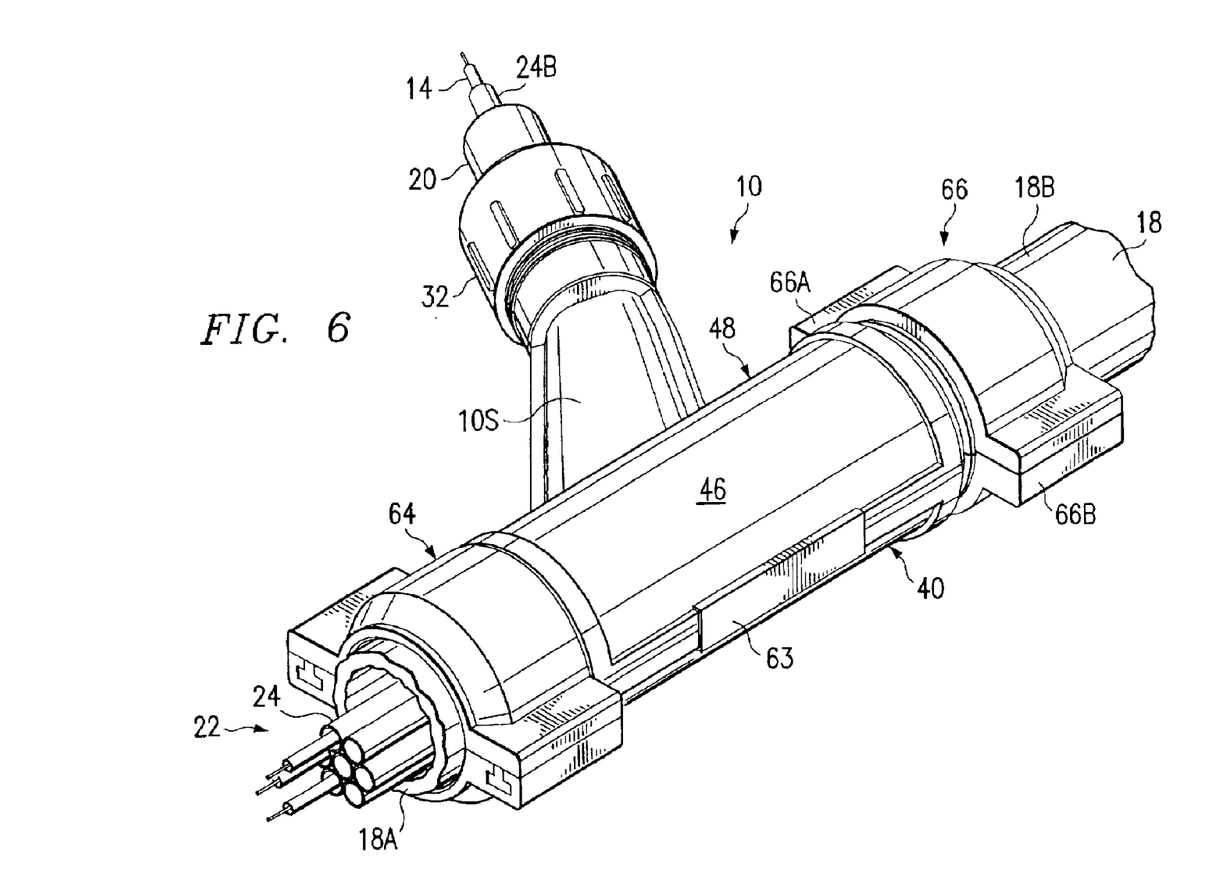
FIG. 6 is a perspective view of the branch connector, with coupling collars removed and the distribution duct and branch duct partly cutaway.

Referring again to FIG. 5, the Y-branch connector 10 is assembled in the operative branching position by opening the splittable restoration housing members 40, 48 and then inserting the cut duct end portions 18A, 18B into the inlet and outlet openings 60, 62 respectively, with the duct end portions being placed in alignment with the longitudinal axis A of the restoration passage 56, as shown in FIG. 8. The housing members 40,48 are then closed together as shown in FIG. 6. The housing members are clamped tightly together by the coupling collars 64, 66 as shown in FIG. 7 and FIG. 8.

The complementary male and female components of each coupling collar are initially pulled apart and separated ((FIG. 9, FIG. 10) so that they can be placed around the assembled duct end portions 18A, 18B that previously were inserted into the duct restoration passage 56 (FIG. 5). (the collars can also be placed around the duct end portions before the Y-connector is placed, and even before the protective duct is opened; the need for the collars to be splittable remains because the guide-tubes that are not branched will not be cut, especially not when a through going cable is already present.). The complementary male and female components 64A, 64B are then slipped together and interlocked, forming a complete coupling collar (FIG. 13) that is then ready to be assembled onto the threaded end portions of the clamped-together housing shells 40, 48.

The male and female coupling components of each coupling collar 64, 66 are mutually engagable with each other in an interlocking union thereby forming a unitary threaded fastener. They also can be pulled apart and separated for individual placement and reassembly about the free end portions of the existing duct after the cut end portions have been inserted into the duct restoration passage and the housing shells have been closed around them in the restoration position. By this separable fastener arrangement, the male and female coupling components can be placed into interlocking union with each other while encircling the clamped end portion of the existing duct, thereby forming a unitary coupling collar for engaging the threaded end portions of the closed-together housing shells.

The housing members include concave neck portions 78,80 forming the tubular branch stub 10S in communication with the restoration duct passage 56 when the housing members are assembled together in the operative branching position. By this arrangement the branch stub is also splittable, to facilitate routing of the branch guide tube. However, the branch stub can also be integrally formed with only one of the housing members, and can provide comparable branch service, since the cut end of the guide tube may be easily inserted into the branch passage.

The branching (coupled) guide tube 24B follows a smooth path along the axis B of the branch stub 10S with sufficiently large bending radius inside the throat passage 58 in order to allow passing of the cable without problems. The unused part of the cut guide tube is closed with a plug. No further installation of guide tubes is needed at the branch connectors. Therefore branch connectors do not need to be smooth-walled and pressure resistant. They should, however, be at least mud-tight.

The branch connector 10 has a Y-shape according to FIG. 2 but may also have, for instance, a T-shape or even several branch openings and/or branch stubs. More than one guide tube can be inserted into the branch duct and guided through the Y- or T-connector and connected to the guide tubes from bundle 22. It is also possible to connect two guide tubes in the bundle 22 in opposite directions (in T-connector) resulting in a redundant connection from there.

Because the Y-branch connector 10 and the coupling collars 64, 66 are each separable, the branching connection can be completed without cutting guide tubes or cables that are already laid in the protective duct 18. This means that new branching points can be established at any mid-span location at any time to provide new cable service with no interruption of existing cable services.

It will be appreciated that the guide-tube branching system of the present invention is a new concept for optical access networks that overcomes the limitations of conventional technology. It consists of loose bundles of individual guide tubes running from a protective trunk duct and smaller guide branch ducts branch to the subscribers. Low-cost splittable "clip-on" Y-branch connectors are used which can be placed at any place and any time, without disturbing existing cabling. After connection of the chosen guide tubes to each other, dedicated cable paths are created. Here miniaturized cables can be installed without splicing, e.g. by simply pushing or using compressed air to blow the cables through the branching guide tubes. These cables may be copper twisted-pair (1 quad) or optical (2–48 fibers) cables. Also coaxial cables can be blown in the branched guide tube systems. All cable constructions offer excellent resistance to outside plant conditions and handling. Preferably, the guide tubes are installed in a loose bundle that does not entirely fill up the protective duct to offer sufficient mechanical protection, to make all tubes accessible at any mid-span location and for ease of installation of the bundle.

The concept can be completed with optional joint boxes to connect cables from the feeder-, distribution- and drop-portions of the access network.

The above-described branching installation is achieved using only one protective duct with 10 multiple guide tubes. Trench space is saved. Customers can be connected any place and any time. No window-cuts are needed. Also one layer of splice-points has been eliminated from the network. Furthermore only those fibers are installed which have been paid for (parallel upgrading). And when new customers appear beyond the installed section a new branching section is simply clicked on, allowing passage of a new cable without making a splice (serial upgrading).

Although the invention has been described with reference to certain exemplary arrangements, it is to be understood that the forms of the invention shown and described are to be treated as preferred embodiments. Various changes, substitutions and modifications can be realized without departing form the spirit and scope of the invention as defined by the appended claims.

We claim:

1. A method for installing cables in a ducting system comprising the steps:
    installing a bundle of guide tubes in an existing protective duct by pushing and/or blowing;
    after the guide tubes have been installed, cutting the existing duct at a branch point and exposing the installed guide tubes;
    cutting one or more of the guide tubes at the exposed branch point for connection to one or more branch tubes;
    connecting one or more branch tubes from one or more branch ducts to one or more of the ends of the cut tubes thereby forming one or more dedicated guide channels;
    installing a splittable Y-branch connector around the cut ends of the existing duct and around the one or more branch ducts; and
    installing one or more cables, by blowing or pushing, in one or more of the dedicated guide channels.

2. A method for installing a branch in a protective duct containing a bundle of guide tubes comprising the steps:
    cutting the duct at a location where a branch is to be established, thereby producing a pair of spaced apart duct end portions and exposing the bundle of guide tubes;
    providing a Y-branch connector including separable housing portions forming an inlet opening and an outlet opening and a branch stub forming a branch opening;
    arranging the separable housing portions around the exposed bundle with the inlet opening and an outlet opening proximate the duct end portions;
    cutting one of the guide tubes and leading the free end of the cut guide tube into the branch opening; and
    securing the Y-branch connector onto the duct end portions of the duct such that the duct end portions are received in the inlet opening and the outlet opening, respectively, of the Y-branch connector.

3. A method for installing a branch in a duct according to claim 2, including the steps:
    running one or more branch guide tubes in one or more branch ducts to a branch service location;
    serially connecting one or more of the free ends of the cut guide tubes to one or more of the branch guide tubes; and
    closing the branch stub of the Y-branch connector about the one or more branch ducts.

4. A method for installing a branch in a duct according to claim 2, wherein a branch service guide tube is coupled to the first free end of the cut guide tube using a coupling element that provides an airtight connection between the branch service guide tube and the first free end of the cut guide tube, and wherein the branch service guide tube is led via the branch opening out of the Y-branch connector.

5. A method for installing a branch in a duct according to claim 2, including the step of sealing off the one or more free ends of the cut guide tube.

6. A method for installing a branch in a duct according to claim 2, wherein the closing step is performed by securing the Y-branch connector onto the spaced apart duct end portions with a coupling collar including separable male and female coupling components that are mutually engagable with each other in an interlocking union.

7. A method for installing a branch in a duct according to claim 2, wherein the closing step is performed by securing the Y-branch connector onto the duct with a coupling collar including separable male and female coupling components, separately placing the coupling components around the duct before or after the duct has been cut, bringing the coupling components into interlocking engagement with each other while encircling the duct, thereby forming a unitary coupling collar, inserting the spaced apart duct end portions into the inlet and outlet openings, and then securing the coupling collar onto the Y-branch connector.

8. A method for installing a branch in a duct according to claim 2, wherein the closing step is performed by securing the Y-branch connector onto the duct with a coupling collar including separable male and female coupling components, separately placing the coupling components around the duct and bringing the coupling components into interlocking engagement with each other while encircling the duct, thereby forming a unitary coupling collar, and engaging the coupling collar in a compressive union against one of the free end portions of the duct.

9. A method for installing a cable drop branch at branch point in a protective duct system in which guide tubes have already been laid, comprising the steps:

providing a Y-branch connector including separable housing portions forming an inlet opening and an outlet opening and a branch stub forming a branch opening;

severing a short section from the protective duct at the branch point, thereby exposing the guide tubes between spaced apart, severed end portions of the protective duct; and opening the separable housing portions and placing them around the exposed guide tubes and severed duct end portions, securing the separable housing portions onto the severed duct end portions, and securing the branch stub around a branch duct.

10. A method for installing a cable drop branch in a protective duct system according to claim 9, including the steps of installing a branch duct between the branch point and a customer access station, running a branch guide tube through the branch duct, cutting one of the exposed guide tubes and connecting the branch guide tube in series with the free end portion of the cut guide tube.

11. A method for installing a cable drop branch in a protective duct system in which guide tubes and cables have already been laid, making it possible to install a cable drop branch in an existing duct without disturbing existing services, characterized by the steps: providing access to the guide tubes for drop branch connection by removing a small duct section from the protective duct at a mid-span location where a drop branch is desired, placing a branch connector with restoration sidewall portions in an operative branch position spanning spaced-apart free end portions of the existing duct at the branch location where the small duct section was removed, clamping the restoration sidewall portions onto the spaced-apart free end portions of the protective duct in spaced relation around the existing guide tubes, thereby forming a serial restoration sidewall between the spaced-apart duct end portions and a restoration passage through which the existing guide tubes and cables extend, the restoration sidewall portions, when clamped together in the operative branch position, also providing an inlet opening and an outlet opening for receiving the free end portions of the protective duct, and providing a branch stub forming a branch opening for receiving a branch duct and a branch guide tube.

12. A method for installing a cable drop branch in a protective duct system as set forth in claim 11, wherein the restoration sidewall portions include portions forming a branch stub in communication with the restoration duct passage, including the steps: installing a branch duct from the branch location to a customer service station, installing a drop-branch guide tube in the branch duct, cutting one of the existing guide tubes at the branch location, and connecting the drop-branch guide tube to the existing cut guide tube.

* * * * *